UNITED STATES PATENT OFFICE.

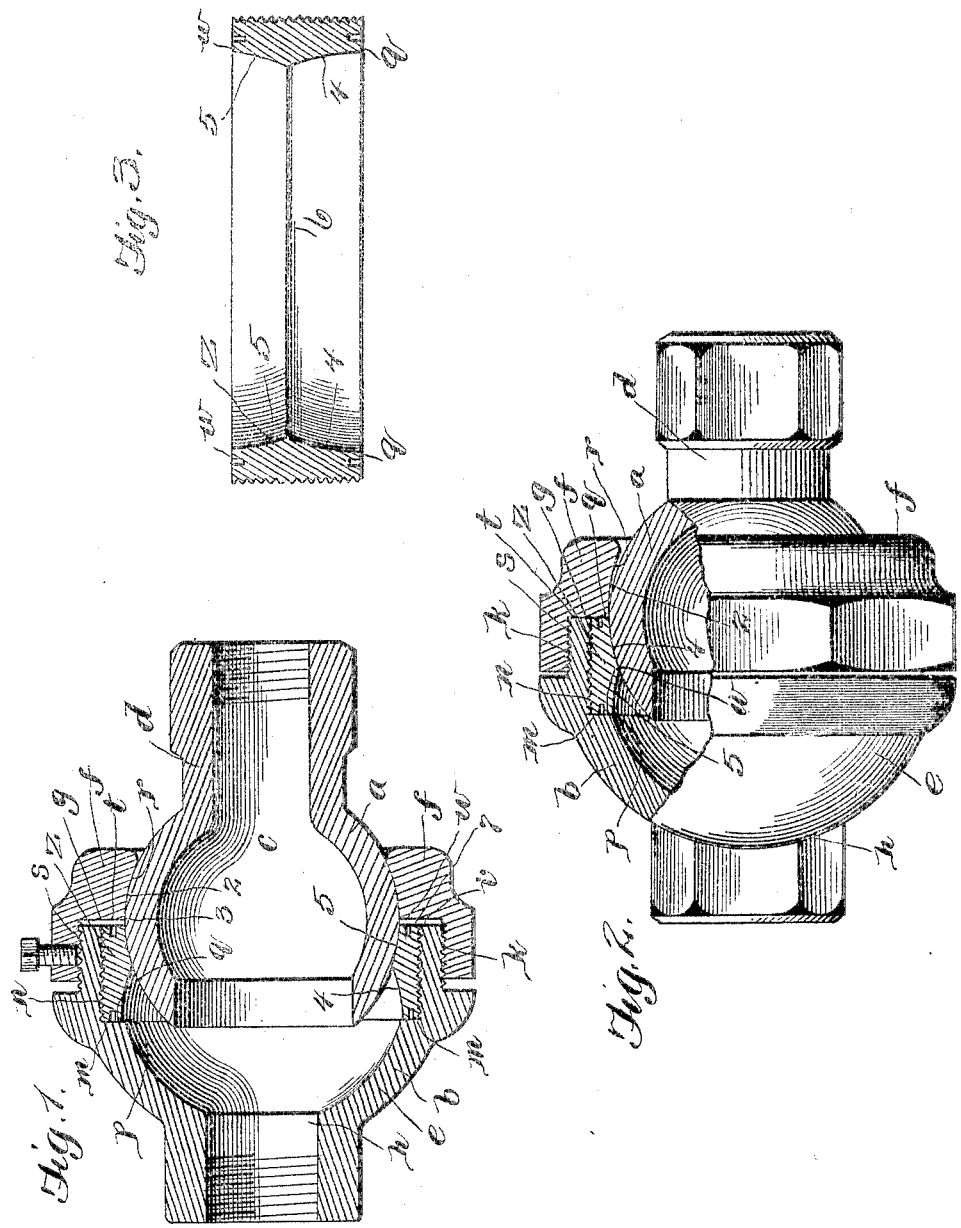

HARRY J. EVERSON, OF LOUISVILLE, KENTUCKY.

PIPE-JOINT.

No. 797,418.    Specification of Letters Patent.    Patented Aug. 15, 1905.

Application filed April 8, 1905. Serial No. 254,550.

*To all whom it may concern:*

Be it known that I, HARRY J. EVERSON, a citizen of the United States, and a resident of Louisville, in the county of Jefferson and State of Kentucky, have made a certain new and useful Invention in Pipe-Joints; and I declare the following to be a full, clear, and exact description of the same, such as will enable others skilled in the art to which it appertains to make and use the invention, reference being had to the accompanying drawings, and to letters and figures of reference marked thereon, which form a part of this specification.

Figure 1 is a central longitudinal section of the joint with the bearing-ring in position for use of joint with liquids. Fig. 2 is a similar view, partly in side elevation, showing the bearing-ring reversed for use of joint with steam. Fig. 3 is a detail view of the bearing-ring.

The invention relates to flexible pipe-joints; and it consists in the novel construction and combinations of parts, as hereinafter set forth.

The object of the invention is to provide a reliable pipe-joint of the character indicated which can be easily changed for use in connection with steam or liquid, as may be desired.

In the accompanying drawings, illustrating the invention, the letter $a$ represents the ball or spherical member, and $b$ the socket member of the joint.

The ball member of the joint is integral, having a hollow spherical part $c$, provided with a neck $d$, which is threaded for connection to a pipe, and an axial opening for communication with the chamber of the bell portion.

The socket member consists of a bell $e$, having a reversible interior bearing $z$, and an adjustable annular closing-cap $f$, having an interior bearing $g$. The bell $e$ is a concave casting provided with an axial neck portion $h$, which is threaded for connection to a pipe. It is also provided with an exterior thread $k$ around its marginal portion, to which the adjustable cap $f$ is connected. The interior of the bell is formed with an annular rabbet $m$, extending from the face $p$ of the marginal portion to an interior shoulder $n$. The circular wall of the rabbet is threaded for the reception of the threaded reversible bearing-ring $z$, the plane face $q$ of which is designed to fit the shoulder $n$ of the bell. The bearing-ring is thus located within the rabbeted portion of the bell, which is made with an aperture of wider extent than the diameter of the equatorial portion of the ball in order to receive the bearing-ring, which is designed to fit the spherical surface of said ball.

The closing cap $f$ is formed with an opening at $r$ of smaller diameter than that of the equatorial portion of the ball and of larger diameter than the neck diameter, and it has an interiorly-threaded flange $s$, terminating at an interior annular shoulder $t$, having a plane face bounding a rabbet $v$, designed to receive a threaded bearing-ring $g$, which has a concave inner face 2, designed to fit the surface of the ball. This bearing-ring is designed to fit the rabbet closely, and its plane marginal face 3 is designed to be even with the shoulder $t$ of said rabbet, or the part $g$ may be integral with the cap. The reversible bearing-ring $z$ is threaded on the outside and has a double concave inside surface. The plane faces $q$ and $w$ of the ring are parallel. This bearing-ring has two spherically-concave inside faces. (Indicated at 4 and 5.) These faces are curved upon equal radii and are relatively arranged, so that they have a slight relative inclination. The middle portion of this ring is thicker than its marginal portions. The face 4 of the ring is slightly depressed relative to the face 5 and is of greater extent measured from the middle line 6. This bearing-ring is designed to be applied with either concave face operative in connection with the exterior spherical surface of the ball, according to requirement. When the bearing-ring is screwed into position with its shorter face 5 in contact with the ball, the latter will be held slightly raised from its full depth in the bell, leaving an interval between the inner faces of the bell and closing ring at 7. Under this adjustment the joint is adapted to be used for liquids, leakage being prevented by the close engagement of the concave faces of the bearing-rings with the surface of the ball. When, however, the bearing-ring $z$ is reversed and screwed into position with the longer face in contact with the surface of the ball, the latter is slightly deeper in the bell and the variation of position causes a loose bearing on the ball, which provides for the use of the joint with steam. In this adjustment the steam-pressure forces the ball to close against the bearing in the cap, and said cap being screwed tightly on the bell the faces 3 and $w$ of the bearing-rings $v$ and $z$ are brought in close contact, preventing leakage of steam.

The bearing-rings are designed to have their plane marginal faces ground true to fit each other closely. These rings are provided with sunken wrench-seats, whereby they may be screwed home, and when in such final position they are designed to fit closely the annular recesses or rabbets, respectively, of the cap and bell, their meeting faces being flush, respectively, with the inner shoulder-face $t$ of the cap and with the marginal face $p$ of the bell.

Having described the invention, what I claim, and desire to secure by Letters Patent, is—

1. In a flexible pipe-joint, the combination with a ball member, a bell member and an annular closing member engaging said bell member, of an interior reversible and double-faced bearing-ring, substantially as specified.

2. In a flexible pipe-joint, the combination with a ball member and a threaded bell member, of an annular closing member exteriorly engaging said bell member, and a threaded double spherical-faced bearing-ring interiorly engaging said bell member, substantially as specified.

3. In a flexible pipe-joint, the combination with a bell member and an annular closing member adjustably engaging said bell member, of an interior adjustable reversible bearing-ring, substantially as specified.

4. In a flexible pipe-joint, an interiorly-threaded bell member, a closing member and a reversible exteriorly-threaded double spherical bearing-ring, substantially as specified.

5. In a flexible pipe-joint, an interiorly-threaded bell member, a closing member and a reversible bearing-ring having two annular concave bearing-faces of unequal height, substantially as specified.

6. A flexible pipe-joint having an interior ball member and in combination therewith a reversible annular bearing having two meeting unequal spherically-concave bearing-faces, substantially as specified.

7. A flexible pipe-joint, consisting of a ball member, an interior annularly-rabbeted bell member, a downward flanged annular closing member adjustably engaging said bell member, and a reversible spherically-concave-faced bearing-ring in said bell member, substantially as specified.

In testimony whereof I affix my signature in presence of two witnesses.

HARRY J. EVERSON.

Witnesses:
C. E. McBride,
Burton C. Rogers.